(12) United States Patent
Shiraishi et al.

(10) Patent No.: US 7,055,665 B2
(45) Date of Patent: Jun. 6, 2006

(54) ONE-WAY CLUTCH

(75) Inventors: Tsutomu Shiraishi, Osaka (JP); Kazuo Iga, Nara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/603,942

(22) Filed: Jun. 26, 2003

(65) Prior Publication Data

US 2004/0000459 A1    Jan. 1, 2004

(30) Foreign Application Priority Data

Jun. 27, 2002    (JP) .......................... P. 2002-188204

(51) Int. Cl.
*F16D 41/06* (2006.01)

(52) U.S. Cl. ...................................... 192/45
(58) Field of Classification Search .................. 192/45, 192/38; 188/82.84
See application file for complete search history.

(56) References Cited

U.S. PATENT DOCUMENTS

| | | | | |
|---|---|---|---|---|
| 3,990,555 A | * | 11/1976 | Carullo .......................... | 192/45 |
| 4,660,698 A | * | 4/1987 | Miura ............................ | 192/45 |
| 4,953,353 A | * | 9/1990 | Lederman ..................... | 192/45 |
| 4,989,705 A | * | 2/1991 | Kashio et al. ................. | 192/45 |
| 5,265,706 A | * | 11/1993 | Iga ................................. | 192/45 |
| 5,271,486 A | * | 12/1993 | Okamoto et al. .............. | 192/45 |
| 5,433,305 A | * | 7/1995 | Takamatsu et al. ........... | 192/45 |
| 5,672,110 A | * | 9/1997 | Kurita et al. .................. | 192/45 |
| 5,941,355 A | * | 8/1999 | Iga ................................. | 192/45 |
| 6,481,656 B1 | * | 11/2002 | Jeong ............................ | 192/45 |
| 6,568,516 B1 | * | 5/2003 | Kemp, III ..................... | 192/45 |

FOREIGN PATENT DOCUMENTS

JP        2-56528        11/1990

* cited by examiner

*Primary Examiner*—Rodney H. Bonck
(74) *Attorney, Agent, or Firm*—McGinn IP Law Group, PLLC

(57) ABSTRACT

A retainer (12) arranged on an inner side of an outer ring (11) is formed with a projection (12d) at an outer periphery thereof by being projected from one end side of the outer ring (11) to an outer side, a recess portion (2b) is formed at a surface of a hole (2a) of a housing (2) which is a member for fitting the outer ring (11) and by fitting the projection 12d of the retainer (12) to the recess portion (2b), not only the outer ring (11) but also the retainer (12) can be constituted to be unable to rotate relative to the housing (2), the relative rotation between the outer ring (11) and the retainer (12) are substantially made unable to carry out in the state via the housing (2).

21 Claims, 4 Drawing Sheets

ONE-WAY CLUTCH

BACKGROUND OF THE INVENTION

The present invention relates to a small-sized one-way clutch having an outer ring of a shell type.

In a small-sized one-way clutch provided with an outer ring of a shell type formed by bending a thin plate, a plurality of cam faces formed at an inner peripheral face of the outer ring are made to be longer than a length of a roller in an axial direction to thereby constitute recess portions for preventing turning of retainers. That is, the retainer provided on the inner side of the outer ring for holding the roller is formed with a projected portion at an outer periphery of one end portion thereof in an axial direction in correspondence with a position of each cam face of the outer ring. By engaging each projected portion with the recess portion extended from each cam face of the outer ring, relative rotation between the outer ring and the retainer is prevented.

Further, there is known a one-way clutch of this kind of a type of forming each cam face at an inner side thereof by expanding a thin plate constituting an outer ring to an outer peripheral side (refer to, for example, JP-B-2-56528). An example thereof is shown by an axially orthogonal sectional view of an essential portion in FIG. 5.

An outer ring 51 made from a thin plate is formed with a portion 51a expanded to an outer side thereof at a constant pitch in a peripheral direction to thereby form a cam face 51b at an inner side portion thereof. Rollers 52 are respectively arranged to an inner side thereof to be brought into contact with each cam face 51b and a shaft 53 is inserted into an inner side thereof. In this example, each roller 52 is urged in a direction of an arrow mark L by a spring 55 integrally formed with a retainer 54 in a state of being contained in a pocket 54a of the retainer 54. Further, in FIG. 5, the spring 55 is shown in a free state and is actually brought into a state of being flexed by being brought into contact with a surface of the roller 52.

The one-way clutch of this kind is used by being fixedly fitted into a hole formed at a central potion of an outer ring fitting member (hereinafter, such a member is referred to as housing member for convenience in the specification) of, for example, a pulley, a gear or the like. Prevention of rotation between the housing member and the outer ring 51 is carried out by constituting a shape of an inner face of the hole of the housing member by a shape by which an outer peripheral face of the outer ring 51 including the expanded portion 51a is fitted thereinto.

Meanwhile, according to the above-described small-sized one-way clutch of the shell type, when comparatively large radial load is operated to the one-way clutch in idly rotating the one-way clutch, for example, when the shaft 53 side is used as an input, a force for carrying to turn the roller 52 by the shaft 53 is increased. When the force exceeds a engaging force (latch strength) between a recess portion of the outer ring 51 extended from the cam face 51b for preventing turning and a projected portion of the retainer 54, as exemplified in FIG. 6, the roller 52 pushes to turn the retainer 54 in the idly rotating direction F and a positional relationship between the outer ring 51 and the retainer 54 in the peripheral direction is shifted. A recess portion of the outer ring 51 for preventing turning is constituted by a sectional shape substantially the same as a sectional shape of the cam face, is comparatively shallow and is of a curved face and therefore, it is difficult to increase the above-described latch strength.

Further, when the above-described positional shift of the retainer 54 relative to the outer ring 51 in the peripheral direction is brought about, in the case in which the shaft 53 is rotated to a locking side thereafter, as shown by FIG. 7, not only the force of urging the roller 52 by the spring 55 is reduced but also the roller 52 interferes with a pillar 54b of retainer 54 disposed in the locking direction and the roller 52 cannot move to a locking position to thereby amount to a problem of bringing about a failure in locking.

SUMMARY OF THE INVENTION

The invention has been carried out in view of such an actual situation and it is an object thereof to provide a one-way clutch of a shell type capable of firmly preventing a retainer from shifting to an idly rotating side and therefore, capable of reducing a failure in locking from being brought about as less as possible even when radial load is operated in idly rotating.

In order to solve the aforesaid object, the invention is characterized by having the following arrangement.

Aspect 1. A one-way clutch comprising:

an outer ring fitting member including a hole, in which a recess portion is formed at an inner peripheral face of the hole;

a shaft passed through the hole of the outer ring fitting member;

an annular outer ring including a plurality of cam faces on an inner peripheral face thereof, which is fitted into the hole of the outer ring fitting member and through which the shaft is passed;

a plurality of rollers arranged between the shaft and the annular outer ring so as to correspond to the plurality of cam faces, respectively; and an annular retainer for retaining the plurality of rollers fitted to the outer ring, the retainer including, an axially projected portion projected from the outer ring in an axial direction thereof, and a projection projected from the axial projected portion in a radial direction of thereof, which is fitted to the recess portion of the outer ring fitting member.

Aspect 2. The one-way clutch according to the aspect 1, wherein the retainer includes a plurality of urging members for urging the plurality of rollers in a peripheral direction thereof, respectively.

Aspect 3. The one-way clutch according to the aspect 1, wherein the retainer includes a plurality of radial projected portions formed at an outer periphery thereof, the outer ring includes a plurality of recess portions extending from the plurality of cam faces, respectively, and the plurality of radial projected portions and the plurality of recess portions are fitted with each other to prevent turning of the retainer relative to the outer ring.

Aspect 4. The one-way clutch according to the aspect 3, wherein a number of the plurality of radial projected portions corresponds to a number of the plurality of recess portions.

Aspect 5. The one-way clutch according to the aspect 1, wherein a plurality of radial projected portions and the plurality of recess portions are fitted with each other by providing a pertinent clearance therebetween.

Aspect 6. The one-way clutch according to the aspect 1, wherein a plurality of the recess portions are formed at the inner peripheral face of the hole, which extend in the axial direction.

Aspect 7. The one-way clutch according to the aspect 6, wherein the outer ring includes a plurality of portions expanded from portions of an outer peripheral face corresponding to the plurality of cam faces, and the plurality of expanded portions are fitted to the plurality of recess portions of the hole.

DETAILED DESCRIPTION OF PREFERRED EMBODIMENTS

An embodiment according to the invention will be described with reference to the drawings as follows.

Figure 1:
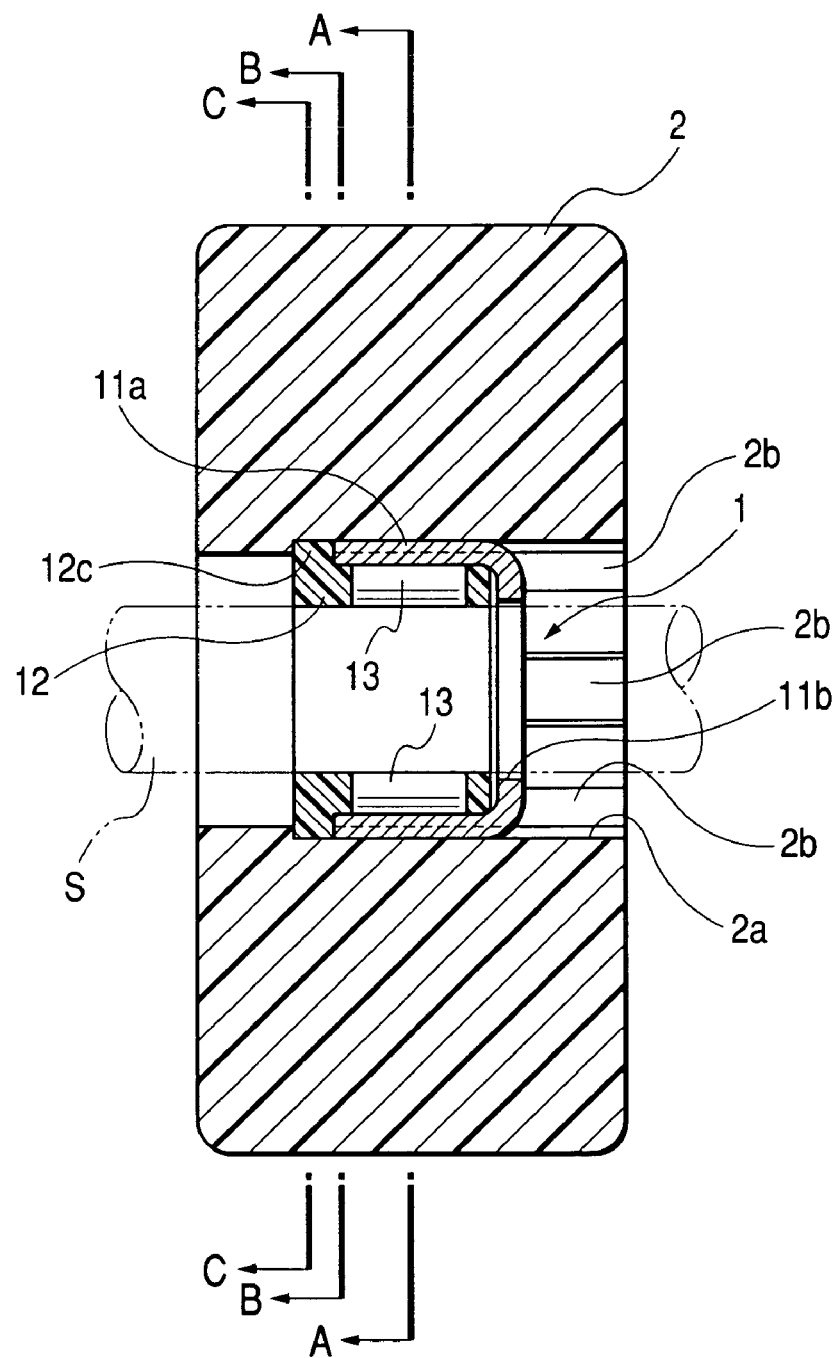
FIG. 1 is an axially parallel sectional view of an embodiment of the invention.
Figure 2:
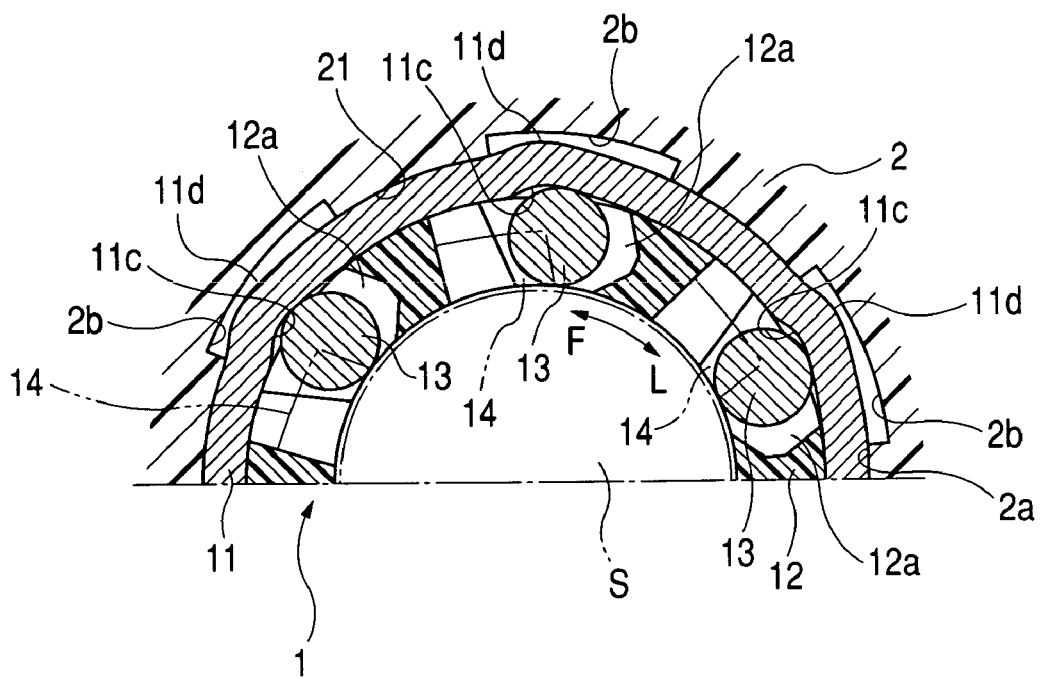
FIG. 2 is a sectional view enlarging an essential portion cut by a face A—A of FIG. 1.
Figure 3:
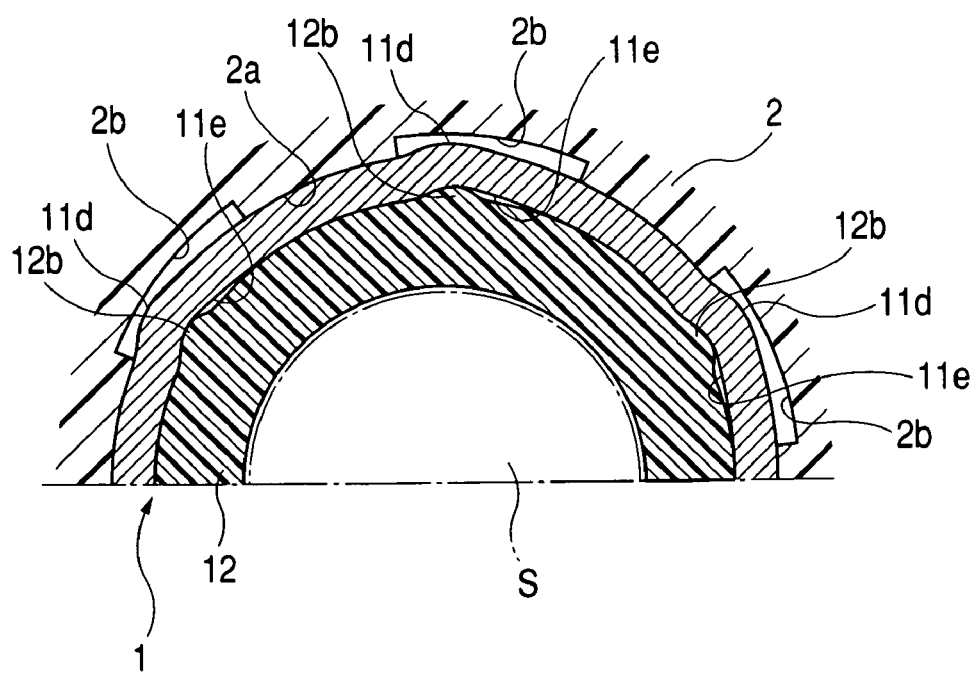
FIG. 3 is a sectional view enlarging an essential portion similarly cut by a face B—B of FIG. 1.
Figure 4:
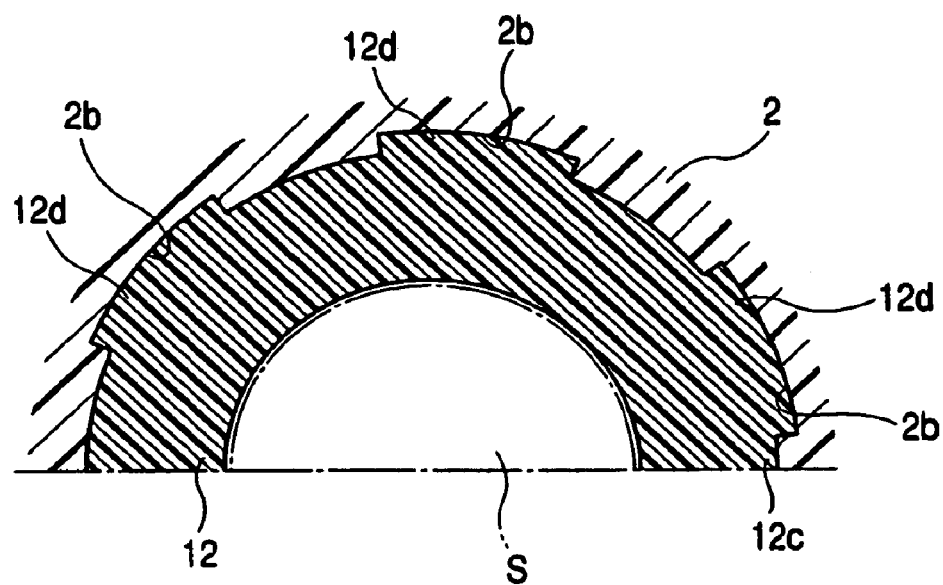
FIG. 4 is a sectional view enlarging an essential portion similarly cut by a face C—C of FIG. 1.
Figure 5:
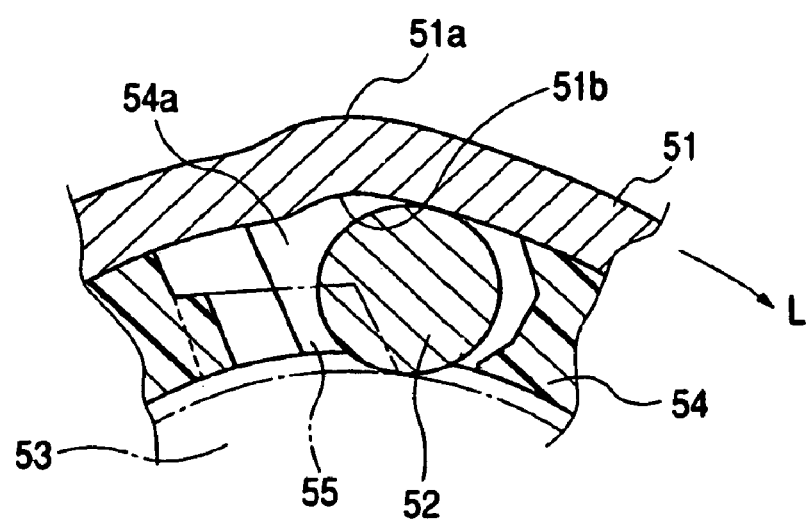
FIG. 5 is an axially parallel sectional view showing an example of constituting a stall-sized one-way clutch of a shell type of a type for forming a cam face at an inner face thereof by expanding a thin plate constituting an outer ring to an outer peripheral side.
Figure 6:
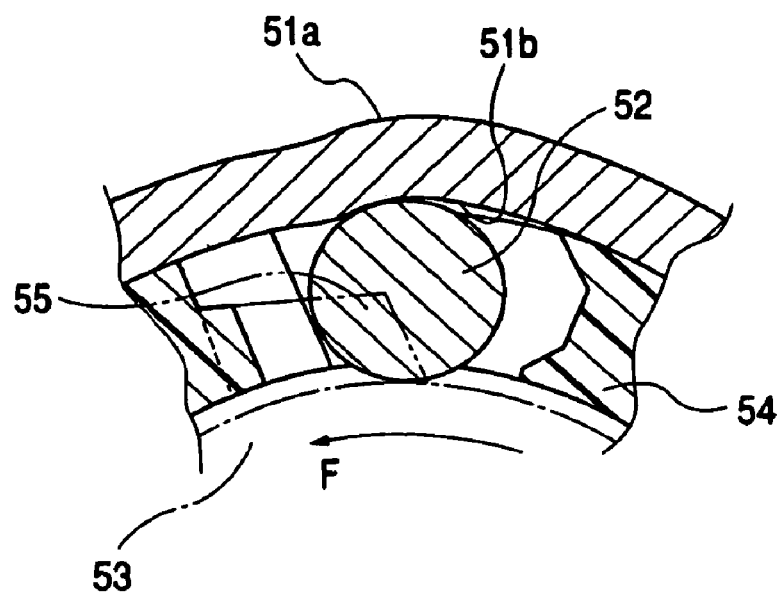
FIG. 6 is an explanatory view of a shift of rotation of a retainer brought about when rotated in an idly rotating direction under operation of a radial load in a conventional one-way clutch of the type of FIG. 5.
Figure 7:
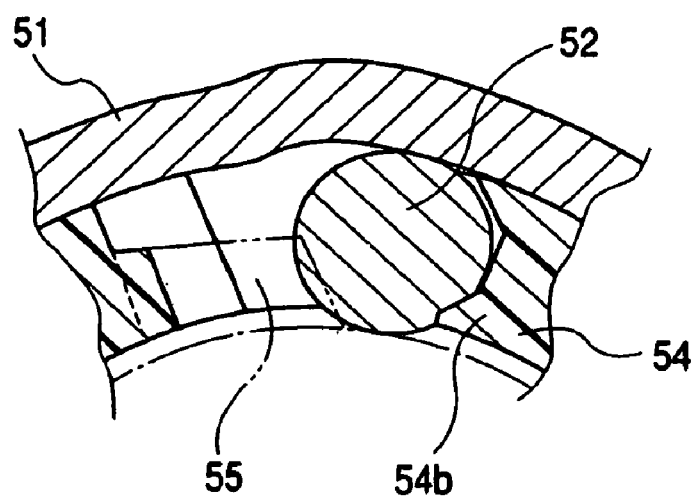
FIG. 7 is explanatory view of a failure in locking of a reduction in urge force of a spring brought about when rotated in a locking direction after bringing about the shift of rotation of FIG. 6 and interference with the retainer.

FIG. 1 is an axially parallel sectional view of an embodiment of the invention, FIG. 2 is a sectional view enlarging an essential portion cut by a face A—A thereof, FIG. 3 is a sectional view enlarging an essential portion similarly cut by a face B—B of FIG. 1 and FIG. 4 is a sectional view enlarging an essential portion similarly cut by a face of C—C of FIG. 1.

A one-way clutch 1 is constituted by an outer ring 11, a retainer 12 provided on an inner side thereof, a plurality of rollers 13 contained in respective pockets 12a of the retainer 12, and a plurality of springs 14 integrally formed with the retainers 12 for pressing the rollers 13 in the respective pockets 12a in a certain direction. Further, in FIG. 2, the spring 14 is shown in a natural state and is actually brought into a state of being flexed by being brought into contact with a surface of the roller 13.

The outer ring 11 made of a thin plate has a shape in which an inner flange portion 11b on one end side of a cylindrical portion 11a is formed. As shown by FIG. 2, an inner peripheral face of the cylindrical portion 11a is formed with a plurality of cam faces 11c in a peripheral direction at a constant pitch and the rollers 13 are arranged in correspondence with each cam face 11c and are capable of rolling thereon. Each cam face 11c is constituted by a face in which a distance to the center gradually reduced respectively toward a side indicated by an arrow mark L. Each cam face 11c of the outer ring 11 includes an expanded portion 11d formed by expanding the thin plate of the cylindrical portion 11a to an outer peripheral side to thereby recess an inner face side thereof. The on an inner face side thereof in accordance therewith are longer in width than a axial length of the roller 13 and extended to reach one end portion at which the inner flange portion 11b is formed, and to the other opened end portion which is opposed to the one end portion. Accordingly, a recess portion 11e is constituted for fitting a projected portion 12b of the retainer 12, mentioned later, with a pertinent clearance therebetween.

Each roller 13 is arranged to roll relative to both of a surface of a shaft S inserted to an inner side thereof and the cam face 11c of the outer ring 1 in a state of being contained in each pocket 12a of the retainer 12 and is urged in a direction indicated by the arrow mark L in FIG. 2 by the spring 14 under the state.

For use, the one-way clutch 1 is inserted into a hole 2a provided at a central portion of a housing 2 which is a member for fitting the outer ring of a pulley, a gear or the like. The hole 2a of the housing 2 is formed with a plurality of recess portions 2b in a groove-like shape at a pitch the same as that of the expanded portion 11b of the outer ring 11. The outer ring 11 is fitted to the housing member 2 to be unable to rotate relatively by fitting the respective expanded portions 11d to the recess portions 2b of the hole 2a.

As shown by FIG. 3, the retainer 12 is formed with a plurality of the projected portions 12b on one end side of the pocket 12a which extend in an axial direction and are arranged at a constant pitch in the peripheral direction. By fitting the projected portion 12b to the recess portion 11e of the outer ring with a pertinent clearance therebetween, a latch mechanism for preventing the outer ring 11 and retainer 12 from rotating relative to each other is constituted.

As shown in FIG. 1, the retainer 12 is formed with a projected portion 12c projected from the opened end portion of the outer ring 11 to an outer side in the axial direction. As shown in FIG. 4, an outer periphery of the projected portion 12c is formed with a plurality of the projections 12d. The respective projections 12d are formed by a number the same as that of the projected portions 12b at positions in the peripheral direction the same as positions of the projected projections 12b. Therefore, each projection 12d is formed at a phase the same as that of the expanded portion 11b of the outer ring 11 and the recess portion 2b of the housing 2. By fitting each projection 12d to the recess portion 2b, the retainer 12 is fitted to the housing 2 to be unable to rotate relative to each other.

According to the embodiment, in FIG. 2, when the shaft S is rotated in the direction of the arrow mark L, each roller 13 is rolled in the same direction, each roller 13 is locked by wedge action between the cam face 11a and a surface of the shaft S and thus rotation of the shaft S is transmitted to the housing 2. At this time, each roller 13 is urged to the direction of the arrow mark L respectively by the spring 14 and therefore, the above-described locking operation is firmly carried out.

Meanwhile, when the shaft S is rotated to a side of an arrow mark F in FIG. 2, each roller 13 is rolled in the same direction F against urge force of the spring 14, each roller 13 is not locked and therefore, rotation of the shaft S is not transmitted to the housing member 2 and thus the shaft S is idly rotated.

According to the retainer 12 in the embodiment, the projected portion 12b is fitted to the recess portion 11e of the outer ring 11 to thereby hamper relative rotation therebetween and at the same time, by fitting the projection 12d at the outer periphery of the projected portion 12c to the recess portion 2b of the housing 2, rotation of the retainer 12 relative to the housing 2 is firmly prevented. Even when the shaft S is rotated in the idly rotating direction F and the roller 13 presses the retainer 12 in a state of operating radial load and press force thereof exceeds the latch strength of the outer ring by the projected portion 12b and the recess portion 11d, the retainer 12 cannot be rotated relative to the housing 2 and therefore, cannot be rotated relative to the outer ring 11.

According to the embodiment, the projected portion 12b constituting the latch mechanism of the retainer 12 with respect to the outer ring 11 and the projection 12d for preventing turning relative to the housing 2 are formed in the same phase and therefore, there is also achieved an advantage that the outer ring 11 and the retainer 12 can simultaneously be brought in phase relative to the housing 2 by only integrating the one-way clutch 1 to the housing 2.

As described above, according to the invention, there is adopted the structure in which the retainer is provided with the projection at the outer periphery by being projected from the one end side of the outer ring to the outer side and the projection is fitted to the recess portion provided at the surface of the hole of the housing to which the outer ring of the one-way clutch is fitted to be unable to rotate relative thereto. Therefore, rotation of the retainer relative to the housing as well as rotation thereof relative to the outer ring can firmly be prevented and therefore even when there is an input of radial load in the idly rotating direction in the state of operating the radial load, there is not a concern of bringing about a shift of rotation of the retainer relative to the outer ring by the press force of the roller and the failure in locking caused by the shift of rotation of the retainer can firmly be prevented.

What is claimed is:

1. A one-way clutch comprising:
   an outer ring fitting member comprising a hole, in which a recess portion is formed at an inner peripheral face of the hole;
   a shaft passed through the hole of the outer ring fitting member;
   a thin plate having a substantially uniform thickness and forming a shell-type annular outer ring comprising a plurality of cam faces on an inner peripheral face thereof, which is fitted into the hole of the outer ring fitting member and through which the shaft is passed;
   a plurality of rollers arranged between the shaft and the annular outer ring so as to correspond to the plurality of cam faces, respectively; and
   an annular retainer for retaining the plurality of rollers fitted to the outer ring, the retainer comprising,
      an axially projected portion projected from the outer ring in an axial direction thereof, and
      a projection projected from the axially projected portion in a radial direction thereof, which is fitted to the recess portion of the outer ring fitting member to prevent the retainer from rotating with respect to the outer ring fitting member,
   wherein each of said plurality of cam faces includes an expanded portion formed by expanding a cylindrical portion of said thin plate to an outer peripheral side to recess an inner face side thereof, and
   wherein said expanded portion is fitted to said recess portion.

2. The one-way clutch according to claim 1, wherein the retainer further comprises a plurality of urging members for urging the plurality of rollers in a peripheral direction thereof, respectively.

3. The one-way clutch according to claim 1, wherein
   the retainer further comprises a plurality of radially projected portions formed at an outer periphery thereof,
   a plurality of expanded portions of the shell-type annular outer ring form a plurality of recess portions extending from the plurality of cam faces, respectively, and
   the plurality of radially projected portions and the plurality of recess portions are fitted with each other to prevent turning of the retainer relative to the outer ring.

4. The one-way clutch according to claim 3, wherein
   a number of the plurality of radially projected portions corresponds to a number of the plurality of recess portions.

5. The one-way clutch according to claim 1, wherein
   the retainer comprises a plurality of radially projected portions and a plurality of expanded portions of the shell-type annular outer ring forming a plurality of recess portions that are fitted with each to provide a clearance therebetween.

6. The one-way clutch according to claim 1, wherein
   a plurality of expanded portions of the shell-type annular outer ring form a plurality of recess portions at the inner peripheral face of the hole, which extend in the axial direction.

7. The one-way clutch according to claim 6, wherein
   the shell-type annular outer ring comprises a plurality of portions expanded from portions of an outer peripheral face corresponding to the plurality of cam faces, and
   the plurality of expanded portions are fitted to the plurality of recess portions of the hole.

8. The one-way clutch of claim 1, wherein said recess portion comprises an axially and radially extending surface that abuts an axially and radially extending surface of said projection of said annular retainer.

9. The one-way clutch of claim 8, wherein said axially and radially extending surfaces are substantially planar.

10. A one-way clutch comprising:
    a housing defining a hole with a recess in an inner peripheral surface of the hole;
    a thin plate having a substantially uniform thickness and forming an outer ring in the hole of the housing;
    a plurality of rollers within an inner peripheral surface of the outer ring;
    an annular retainer within an inner peripheral surface of the outer ring and comprising:
       a projected portion projecting axially out of the outer ring; and
       a projection engaging the recess of the housing to prevent the retainer from rotating with respect to the housing; and
    a shaft extending through the annular retainer.

11. The clutch of claim 10, wherein a plurality of expanded portions of the outer ring form a plurality of cam faces on the inner peripheral face.

12. The clutch of claim 11, wherein the annular retainer further comprises a plurality of radially extending projections received by the plurality of cam faces.

13. The clutch of claim 12, wherein the inner peripheral face of the outer ring and the plurality of radially extending projections define a clearance therebetween.

14. The clutch of claim 12, wherein the plurality of cam faces receives the plurality of radially extending projections to prevent the retainer from rotating with respect to the outer ring.

15. The clutch of claim 10, wherein said annular outer ring comprises a radially expanded portion that extends into the recess to prevent the outer ring from rotating relative to the housing.

16. A one-way clutch comprising:
   a housing defining a hole with a recess having an axially and radially extending surface in an inner peripheral surface of the hole;
   a thin plate having a substantially uniform thickness and forming an outer ring in the hole of the housing;
   a plurality of rollers within an inner peripheral surface of the outer ring;
   an annular retainer within an inner peripheral surface of the outer ring and comprising:
      a projected portion projecting axially out of the outer ring; and
      a projection comprising an axially and radially extending surface that abuts the axially and radially extending surface of the recess of the housing; and
   a shaft extending through the annular retainer.

17. The clutch of claim 16, wherein the annular outer ring comprises a plurality of expanded portions forming a plurality of cam faces on the inner peripheral surface.

18. The clutch of claim 17, wherein the annular retainer further comprises a plurality of radially extending projections received by the plurality of cam faces.

19. The clutch of claim 18, wherein the inner peripheral surface of the outer ring and the plurality of radially extending projections define a clearance therebetween.

20. The clutch of claim 18, wherein the plurality of cam faces receives the plurality of radially extending projections to prevent the retainer from rotating with respect to the outer ring.

21. The clutch of claim 16, wherein the outer ring comprises a radially expanded portion that extends into the recess to prevent the outer ring from rotating relative to the housing.

* * * * *